(12) United States Patent
Smith (10) Patent No.: US 6,604,562 B1
(45) Date of Patent: Aug. 12, 2003

(54) TREE PUSHER

(76) Inventor: Wayne J. Smith, 1064 Noah Trail NW., Brookhaven, MS (US) 39601

( * ) Notice: Subject to any disclaimer, the term of this patent is extended or adjusted under 35 U.S.C. 154(b) by 0 days.

(21) Appl. No.: 10/064,161

(22) Filed: Jun. 17, 2002

(51) Int. Cl.[7] .......................... A01G 23/08; B66F 13/02
(52) U.S. Cl. ...................... 144/34.2; 144/34.1; 254/1; 254/12; 254/133 R
(58) Field of Search .................. 254/1, 2 B, 12, 254/13, 133 R; 144/34.2; 269/17, 51, 60

(56) References Cited

U.S. PATENT DOCUMENTS

| | | | |
|---|---|---|---|
| 1,477,298 A | * 12/1923 | Templeton | |
| 1,482,846 A | 2/1924 | Harrah | |
| 2,960,309 A | * 11/1960 | Swanson | 254/133 R |
| 3,548,899 A | * 12/1970 | Emerson | 144/34.2 |
| 4,148,462 A | * 4/1979 | Jessup | 254/133 R |
| 4,564,173 A | * 1/1986 | Atherton et al. | 244/133 R |
| 4,660,806 A | 4/1987 | Masters | 254/11 |
| 5,992,824 A | * 11/1999 | Voss | 254/2 B |
| 6,135,419 A | 10/2000 | Hutson, Jr. et al. | 254/2 R |
| 6,234,453 B1 | * 5/2001 | Block | 254/285 |

\* cited by examiner

*Primary Examiner*—W. Donald Bray
(74) *Attorney, Agent, or Firm*—Reginald F. Roberts, Jr.

(57) ABSTRACT

A tree pusher for safely felling trees. The tree pusher controls and determines the direction in which the tree falls, using a base, a frame, a detachable head which engages the tree trunk, and an extendable screw-type trailer jack that is repairable/replaceable during operation and capable of bearing the weight of a large tree, for urging the frame and the head against the trunk of the tree. For use on uneven ground, the tree pusher is provided with a base extension. A chain is used to connect the base of the tree pusher to the trunk of the tree, to prevent movement of the base when the jack is activated. The tree pusher can be readily moved to the job site, and can be used on any type of terrain, including hard surfaces, and for any type of tree, including trees with rotten wood.

14 Claims, 9 Drawing Sheets

TREE PUSHER

BACKGROUND OF INVENTION

The present invention relates to felling trees. More particularly, the present invention relates to felling trees in a safe and efficient manner by controlling the direction in which the tree falls.

When felling trees, it is a constant problem to determine the direction in which the tree will fall. The problem is especially severe when the tree is leaning in an undesirable direction; e.g., in the direction of a nearby house. When the tree is not leaning in any direction, there is still the problem of preventing the tree from falling on the person or persons who is/are felling the tree. The present invention provides a device and a method for causing the tree to fall in a desired direction.

Attempts have been made to solve these problems, but they have not been successful.

U.S. Pat. No. 4,184,462 to Jessup discloses a tree-felling device adapted to engage a tree being cut down, and to exert a force thereagainst in a particular direction, in order to cause the tree to fall in a selected area. The tree-felling device includes a jacking device of the basic bumper type which is adapted to support an elongated pusher having a tree-engaging head secured at one end thereof, and which is preferably tied to the tree to be cut. As a part of the jacking device, there is provided a ratchet mechanism having an anchoring stud secured thereto for generally receiving and stabilizing one end of said pusher, while the jacking assembly is provided with a support clip about the top portion thereof for holding the pusher.

U.S. Pat. No. 4,564,173 to Atherton et al. discloses an apparatus for pushing a tree over when the tree is being cut down. When a base connected to a bumper jack is placed on a ground surface, the apparatus is tipped at an angle between the ground surface and the tree. A jack handle operates a mechanism to rise along a jack post, causing a support member to push a shaft through an aperture in a guide member until points on a tip member contact the tree, pushing the tree over when the tree is being cut down.

The principal defects of these prior-art inventions are the following:

(a) A bumper jack is not capable of handling the weight of a large tree.

(b) A bumperjack cannot extend its length to a jack post if a longer jack is needed to push the tree over.

(c) The bumper-jack post would bear the entire weight of the tree. If the post should break, the tree could very possibly fall on the person or persons felling the tree, or fall in some other undesirable direction.

(d) If the jack should fail or break under the load, the jack could not be repaired or changed out during the tree-felling operation.

(e) In the case of the Jessup patent, the head plate (36) which engages the tree is not embedded in the wood of the tree. If the tree turns or twists, the head plate will move, slip, or become disconnected from the tree.

(f) Neither device could be used to fell dead or rotten trees, because neither head is designed to engage dead or rotten wood.

(g) In the case of the Jessup patent, there is nothing to hold the head plate (36) up while the tree-felling device is placed in position to fell the tree.

(h) In the case of the Jessup patent, once the tree is lying on the ground, it would be difficult to disconnect and remove the chain (38) from the tree trunk.

(i) In the case of the Jessup patent, there is nothing to prevent the pusher (34) from sliding off the head plate (36) when pressure is applied by the jack.

(j) In the case of the Jessup patent, in the event that the tree twists or turns, there is nothing to hold the pusher (34) against the head plate (36).

(k) The bumper jack lifts the load with a ratcheting action that allows for a rocking motion of the tree. This can cause the wood in the hinge point to break.

(l) Bumper jacks have a large number of moving parts, and have springs which may weaken and break.

(m) Under load, the support plate for the jack would flip or rise up in front, causing the plate to skid or to be pushed backwards.

(n) There is nothing to prevent the jack support plate from being pushed into the ground or away from the tree.

(o) Neither tree-felling device is usable on hard surfaces.

(p) The tree-felling devices could not be used on banks or inclines.

(q) There is no effective way of transporting the tree-felling devices to the job site.

The present invention provides an effective solution to these problems.

SUMMARY OF INVENTION

In general, the present invention in a first aspect provides a tree-pusher for safely felling trees. The tree-pusher comprises (a) a base, (b) a frame mounted on the base, (c) a detachable head which engages the tree, and (d) a screw-type propeller trailer jack for urging the frame and the pronged head against the tree.

The frame comprises first, second, third, and fourth rectangular tubes. The first tube is pivotally connected to the base. The second tube is disposed in the first tube. The third tube is constructed and arranged to slide over the second tube. The fourth tube is constructed and arranged to be inserted in and pinned to the third tube.

The head is constructed and arranged to be disposed in the fourth tube, to attach itself to a trunk of a tree, and to detach itself from the frame and remain attached to the trunk as the tree falls.

The jack, which is attached to the frame, is extendable, capable of bearing the weight of a large tree, and capable of being repaired or changed out under load during a tree-felling operation.

In a second aspect the invention provides a method for felling a tree. The method comprises (a) providing a tree-pusher having a base, a frame, a detachable head which engages the tree trunk, and a screw-type propeller trailer jack for urging the frame and the head against the trunk of the tree; (b) securely connecting the base of the tree-pusher to the trunk of the tree; (c) attaching the head and frame of the tree-pusher to one side of the tree trunk; (d) cutting a notch in the trunk of the tree above the point of attachment of the tree pusher and on the side opposite the attachment of the head and frame thereto; and (e) using the jack to urge the head and frame of the tree-pusher against the tree trunk to fell the tree, and detach the head from the frame of the tree pusher as the tree falls.

DETAILED DESCRIPTION

Figure 1:
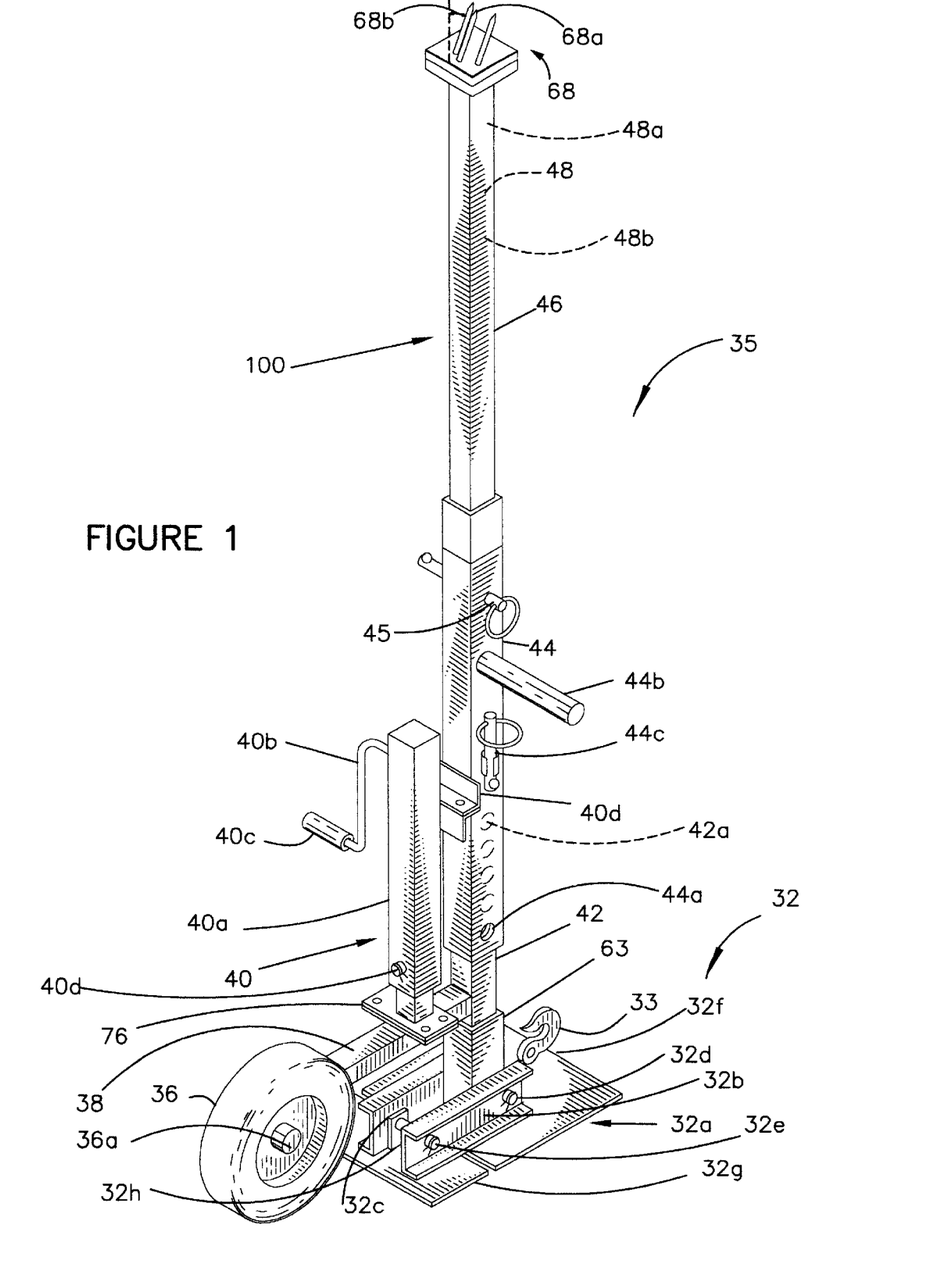
FIG. 1 is an isometric side elevation of a first embodiment of a tree pusher, made in accordance with the principles of the present invention.
Figure 2:
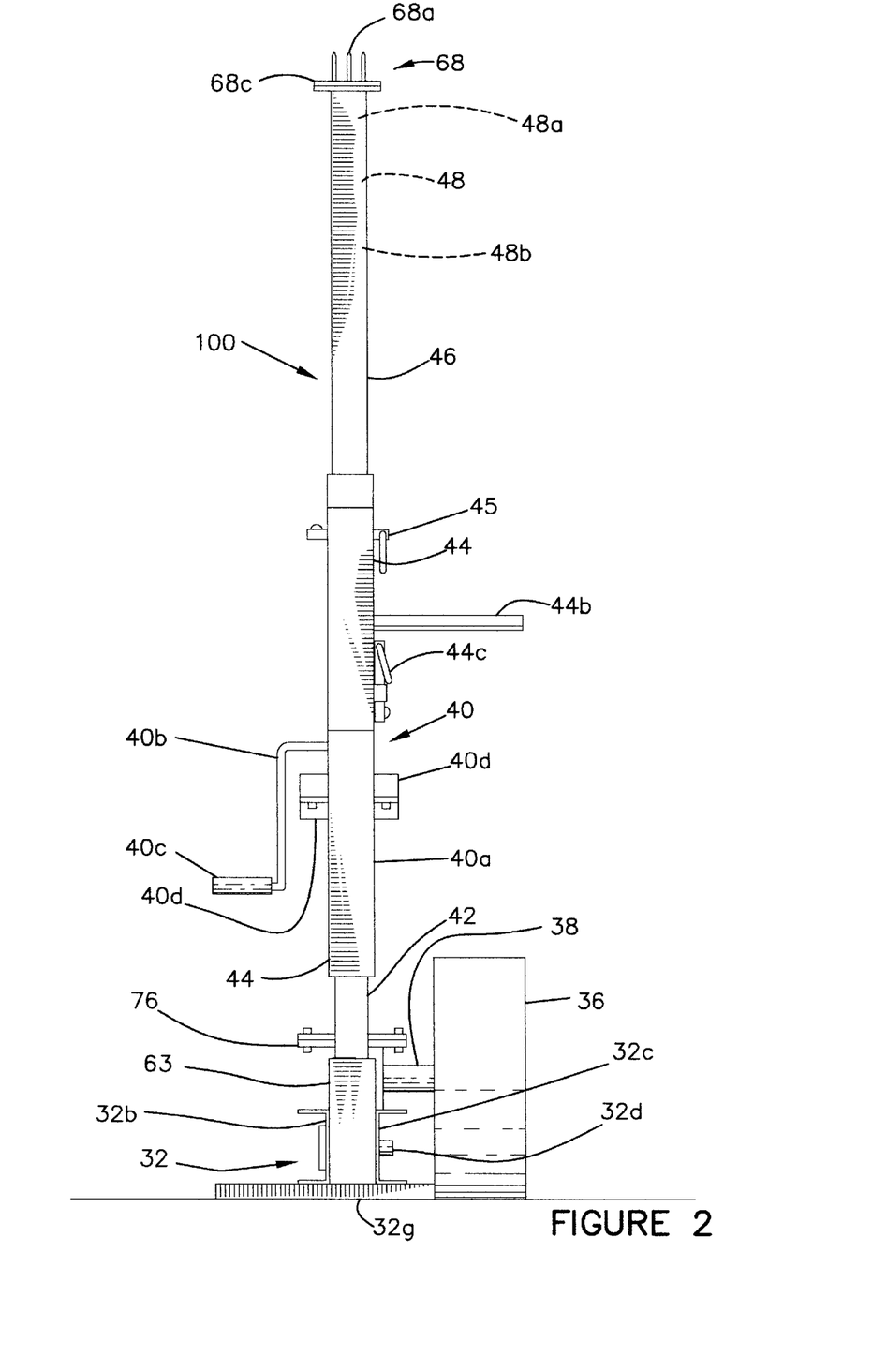
FIG. 2 is an isometric rear view of the tree pusher shown in FIG. 1.

More specifically, reference is made to FIGS. 1 and 2, in which is shown a first embodiment of a tree pusher, made in accordance with the principles of the present invention, and generally designated by the numeral 100.

The tree pusher 100 comprises a base 32, a frame 35, a detachable pronged head 68 which engages a tree, a screw-type propeller trailer jack 40 for urging the frame 35 and head 68 against the tree, and a wheel 36 for moving the tree pusher The base 32 comprises a split plate 32a having first and second portions 32f and 32g. First and second parallel channel irons 32b and 32c are spaced apart from one another and fastened to the first portion 32f of the split plate 32a in a perpendicular orientation. A hook 33 is fastened to the first portion 32f of the split plate 32a, for attachment of a chain to the hook 33 and thereby to the base 32.

A pair of parallel plates 32h having openings therein are spaced apart and fastened to the second portion 32g of the split plate 32a. The plates 32h are identical to those shown in FIG. 8A at 65a with openings 65b. Only one of the plates 32h is shown in FIG. 1, and the opening in plate 32h is not shown in that drawing.

The frame 35 comprises first, second, third, and fourth rectangular tubes 63, 42, 44, and 46, respectively. The first tube 63 is disposed between first ends of the channel irons 32b and 32c and pivotally connected thereto by a first pin 32d. The first ends of the channel irons 32b and 32c are fastened to one another and pivotally connected to the first rectangular tube 63 by the first pin 32d. Second ends of the channel irons 32b and 32c are fastened to one another by a second pin 32e, thereby fastening the first and second portions 32f and 32g of the split plate 32a to one another.

The second tube 42 is disposed in the first tube 63. The third tube 44 is constructed and arranged to slide over the second tube 42. The fourth tube 46 is constructed and arranged to be inserted in and pinned to the third tube 44 by a third pin 45.

Figures 3, 3A:
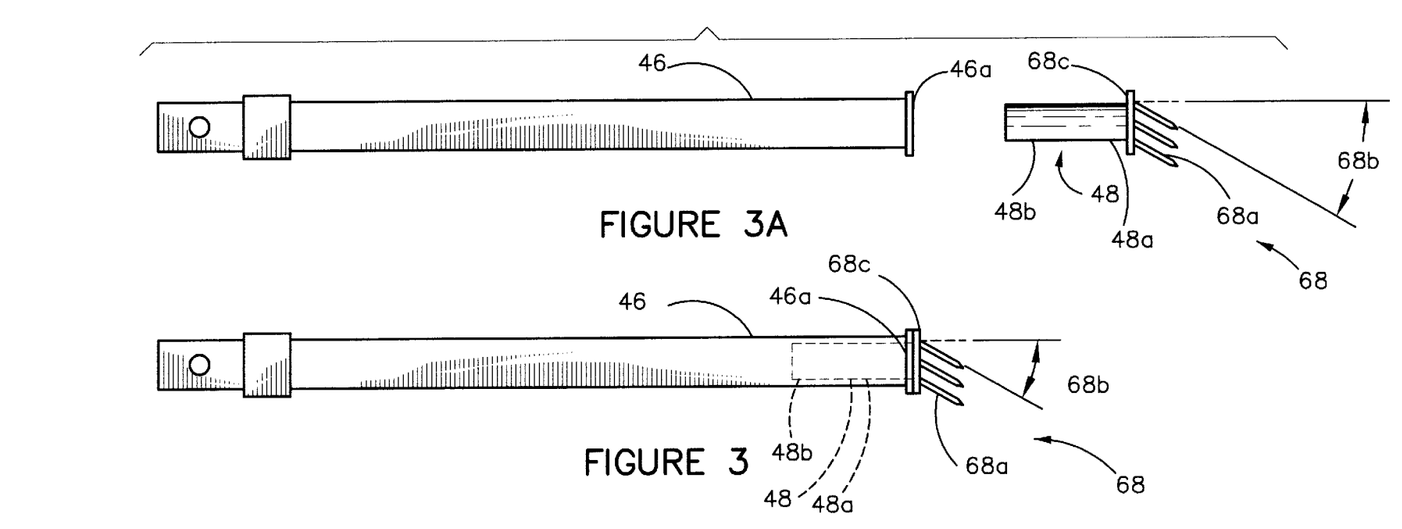
FIGS. 3 and 3A are enlarged schematic representations of a portion of the tree pusher shown in FIGS. 1 and 2.

As will be seen most clearly in FIGS. 3A and 3, the pronged head 68 comprises a cylindrical fifth tube 48 having first and second ends 48a and 48b, and a plurality prongs 68a fastened to a cap 68c at the first end 48a of the fifth tube 48. The fifth tube 48 and each prong 68a define therebetween an angle 68b of from about five to about thirty degrees. The fourth tube 46 is provided with a flange 46a upon which the cap 68c rests when the fifth tube 48 is disposed as shown in the fourth tube 46.

Referring again to FIGS. 1 and 2, the jack 40 comprises a jack base 76 fastened to the second tube 42 by a shaft 38; a body 40a mounted on the jack base 76, fastened to the third tube 44 by a union 40d, and constructed and arranged for movement parallel to the frame 35 of the tree pusher 100; and a crank 40b having a handle 40c, for moving the body 40a of the jack 40.

The wheel 36 is mounted on an axle 36a, which is in turn mounted on the shaft 38 to which the jack base 76 is fastened.

The third tube 44 includes an opening 44a, and a handle 44b for moving the tree pusher 100. In order to lock the second and third tubes 42 and 44 to one another, so that the body 40a of the jack 40 can be extended to provide an extended range for the jack 40 and a means for removing the jack 40 from the frame 35 in the event the jack 40 should break or fail, a pin 44c is inserted into the opening 44a.

The jack 40 is extendable, capable of bearing the weight of a large tree, and capable of being removed, repaired, or changed out under load during a tree-felling operation.

The jack 40 has fifteen inches of movement or extension. When this point has been reached, one would insert pin 44c in opening 44a to lock the second and third tubes 42 and 44 together, thus holding the weight of the tree on the frame 35 of the tree pusher. Then one would pull out the jack pin 44c, and screw the jack 40 back down to start there, by pulling the jack base 76 out to gain another thirteen inches of travel or push in the tree pusher 100. When the jack 40 has been screwed back down to the bottom or starting point, one would reinsert the jack pin 40d in the jack body 40a, thereby locking the jack body 40a in the jack 40. Then one would start to screw the jack 40 again to push the tree, at which time one would remove pin 44c from opening 44a, thus allowing the jack 40 to push the tree for an added thirteen inches of push if needed.

Figure 4:
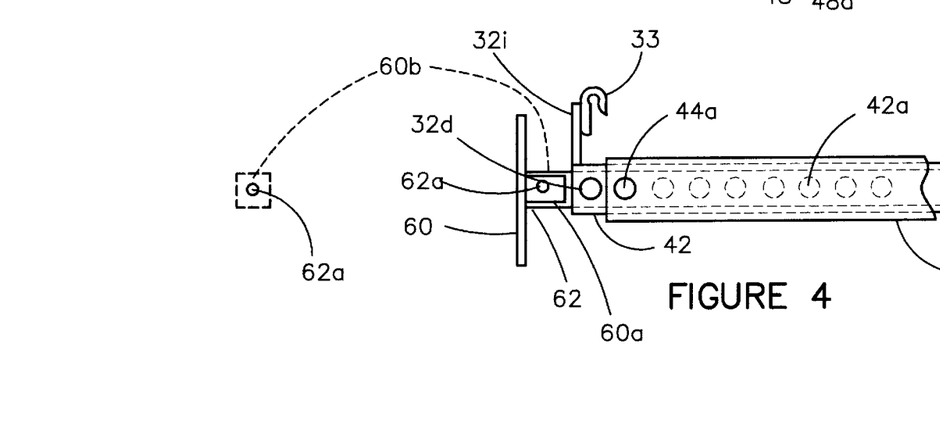
FIG. 4 is a schematic representation of a modified portion of the tree pusher shown in FIGS. 1 and 2.

Reference is now made to FIG. 4, in which is shown a modification of the base 32 shown in FIGS. 1 and 2. The modified base comprises first and second plates 60 and 32i. The second plate 32i is fastened to the second tube 42, preferably by welding. First and second parallel plates 60a and 60b are spaced apart and fastened perpendicularly to the first plate 60. Instead of the first rectangular tube 63 shown in FIGS. 1 and 2, a first rectangular tube 62 is disposed between the first and second parallel plates 60a and 60b, and the plates 60a, 60b, and the first tube 62 are fastened to one another by a pin 62a. The first tube 62 is pivotally attached to the first and second parallel plates 60a and 60b and to the first plate 60, and extends through the second and third tubes 42 and 44. The modified base provides a modest degree of elevation for the tree pusher when used on unlevel ground that is slightly below the ground level of a tree to be cut down. A tree standing on ground below the level of ground on which the tree pusher rests presents no problem; one simply ends up with a tall stump after the tree has been cut down.

Figure 5A:
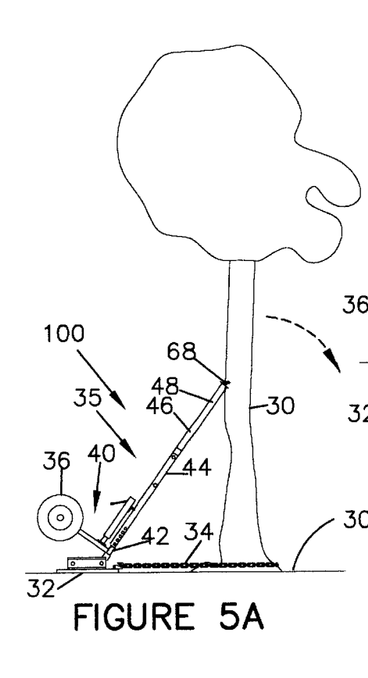
FIGS. 5A, 5B, 5C, and 5D are schematic representations of various stages of felling a tree, using the tree pusher shown in FIGS. 1 and 2.

Reference is now made to FIGS. 5A to 5D, which illustrate a method for felling a tree in accordance with the principles of the present invention. FIG. 5A shows the pronged head 68 of the tree pusher 100 engaging a tree 30 which is to be felled. The tree 30 and the tree pusher 100 are on substantially level ground 30g. The base 32 is connected to the tree 30 by a chain 34 attached to the hook 33 (not shown) of the base 32. The person (not shown) operating the tree pusher 100 has oriented the tree pusher 100 by pivoting the frame 35 on the base 32 so that the tree 30 will fall in the direction indicated by the arrow when force is applied to the tree 30 by the jack 40.

Figure 5B:
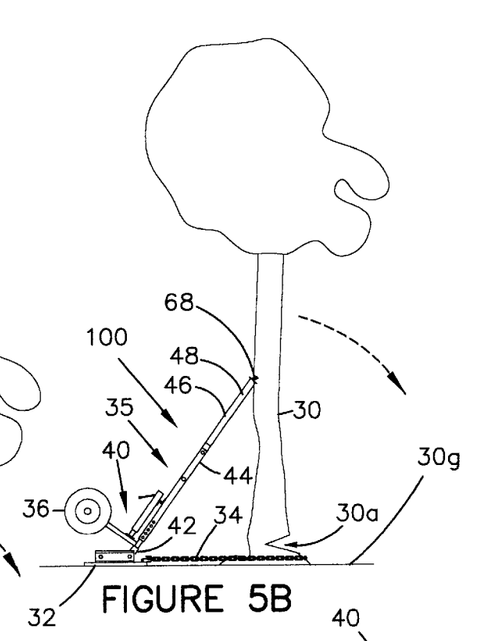

As shown in FIG. 5B, after the tree 30 has been engaged by the tree pusher 100, a V-shaped notch 30a is cut in the trunk of the tree 30 on the side of the tree 30 opposite that of the tree pusher 100, and above the point of attachment of the chain 34. Cutting the notch 30a in the trunk of the tree 30 prepares the tree for felling and reinforces the action of the tree pusher 100 in causing the tree 30 to fall in the chosen and desired direction.

Figure 5C:
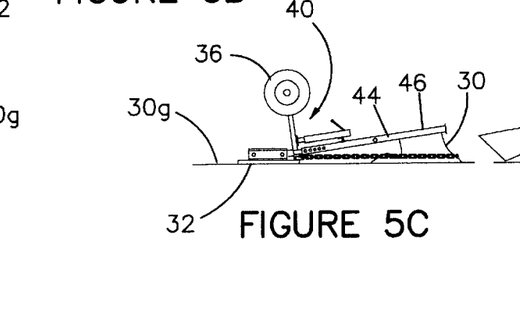
Figure 5D:
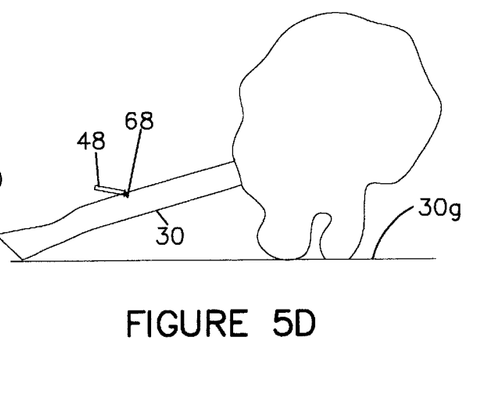

The head 68 remains attached to the trunk of the tree 30 as the tree 30 falls, leaving a stump of the tree 30, as shown in FIGS. 5C and 5D.

Figure 6:
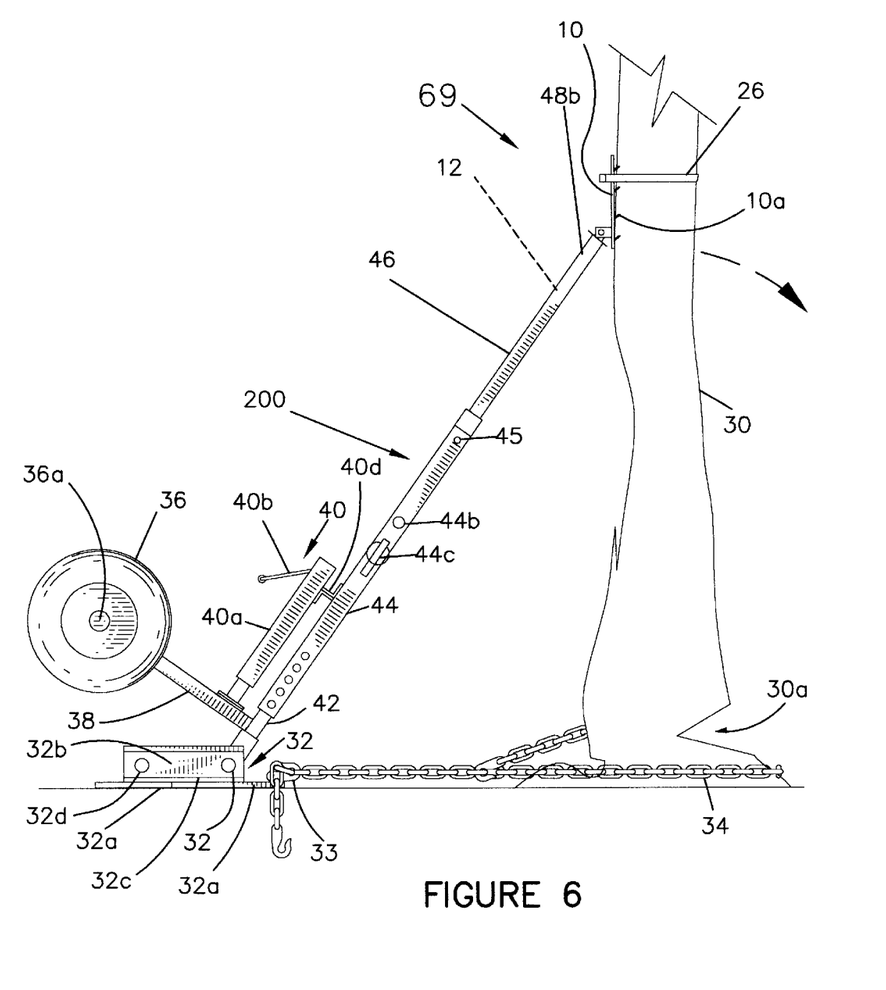
FIG. 6 is an isometric side elevation of a second embodiment of a tree pusher made in accordance with the principles of the present invention, the tree pusher engaging a tree that is to be felled.

Reference is now made to FIG. 6, in which is shown a second embodiment of a tree pusher, made in accordance with the principles of the present invention, and generally designated by the numeral 200. The second embodiment 200 differs from the first embodiment 100 of the tree pusher only in the construction of the wrap-around head 69.

The pronged head 68 is used when the wood of the trunk is reasonably solid. The wrap-around head 69 is used only when the wood is rotten or for some other reason cannot be securely engaged by the prongs 68a of the pronged head 68.

Figure 7A:
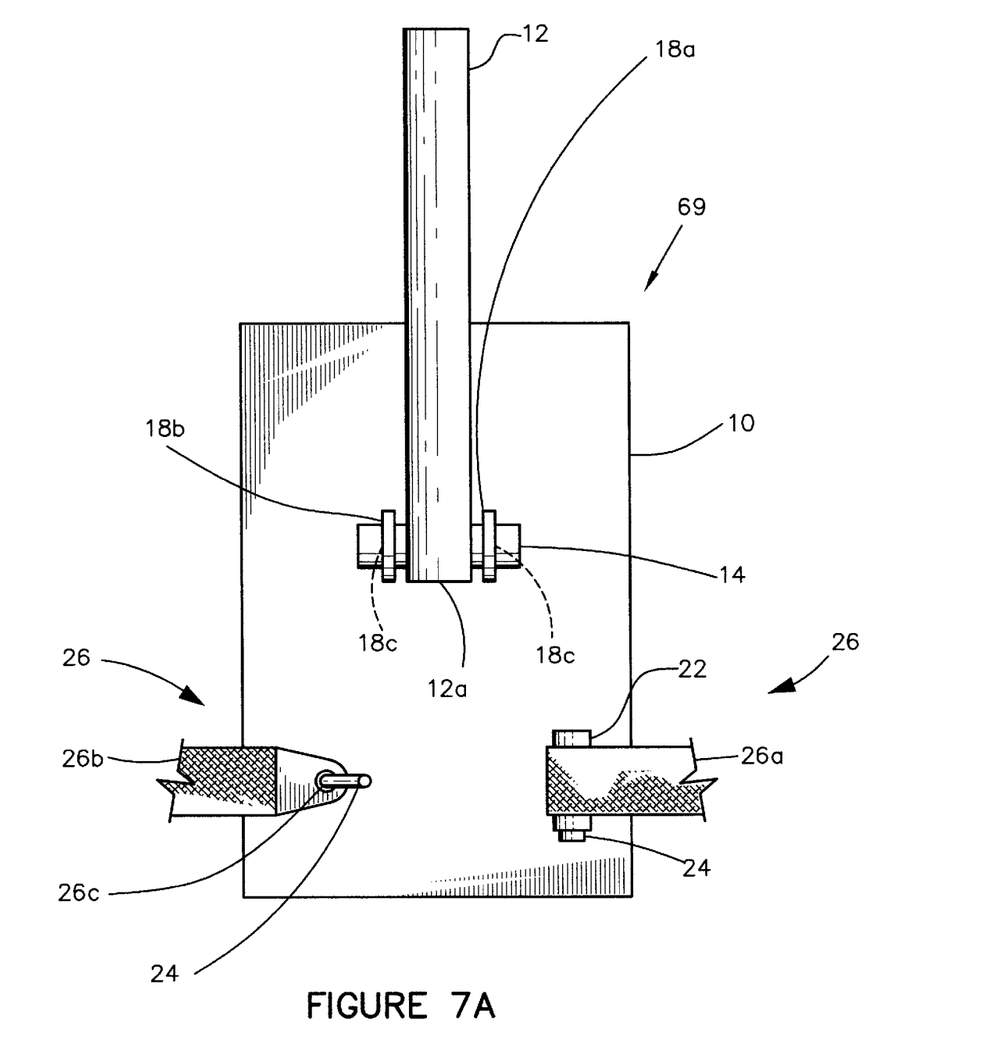
FIGS. 7A and 7B are enlarged schematic representations of opposite faces of a portion of the tree pusher shown in FIG. 6.
Figure 7B:
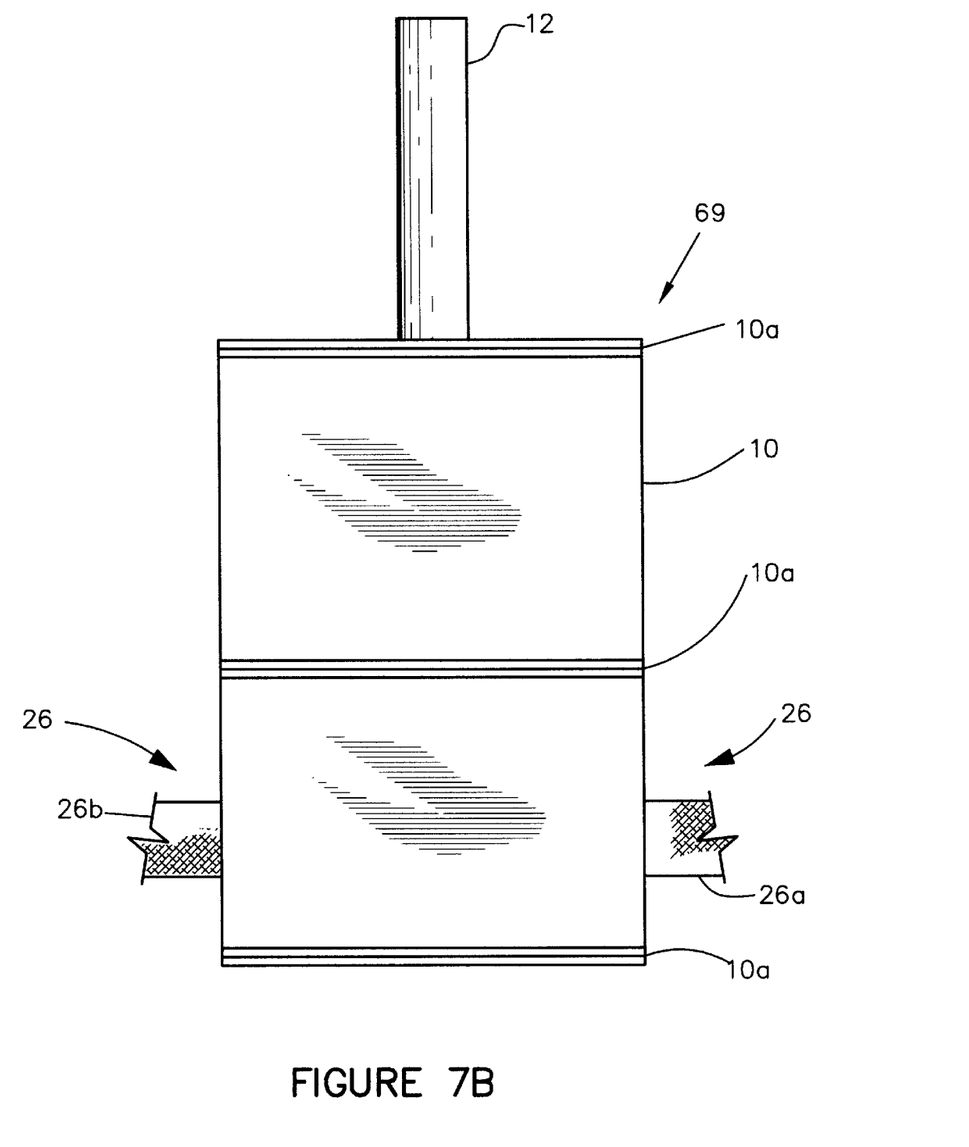

The structure of the wrap-around head 69 can be best understood by reference to FIGS. 7A and 7B, which show opposite faces of the head 69. The wrap-around head 69 is constructed and arranged to be wrapped around the trunk of a tree.

FIG. 7A shows a first face of the head 69. The first face comprises first, second, and third plates 10, 18a, and 18b. The second and third plates 18a and 18b are spaced apart, and are fastened to a first face of the first plate in a perpendicular orientation. The second and third plates 18a and 18b each includes a substantially central opening 18c.

A cylindrical tube 12 has an end 12a pivotally attached to the second and third plates 18a and 18b by a bolt 14 disposed in the central openings 18c. The rest of the tube 12 is disposed in tube 46, as shown in FIG. 6. A ratchet binder 22 and a hook 24 are fastened to opposite sides of the first face of the first plate 10. A Nylon strap 26 has a first end 26a connected to the ratchet binder 22, and a second end 26b connected to the hook 24 through an eye 26c.

FIG. 7B shows a second and opposite face of the wrap-around head 69. A plurality of teeth 10a fastened to a second and opposite face of the first plate 10 penetrate and embed themselves in the dead wood of the tree trunk and, in combination with the strap 26 which is wrapped around the tree trunk, hold the tree pusher 200 firmly and securely to the trunk of the tree 30.

Figure 8:
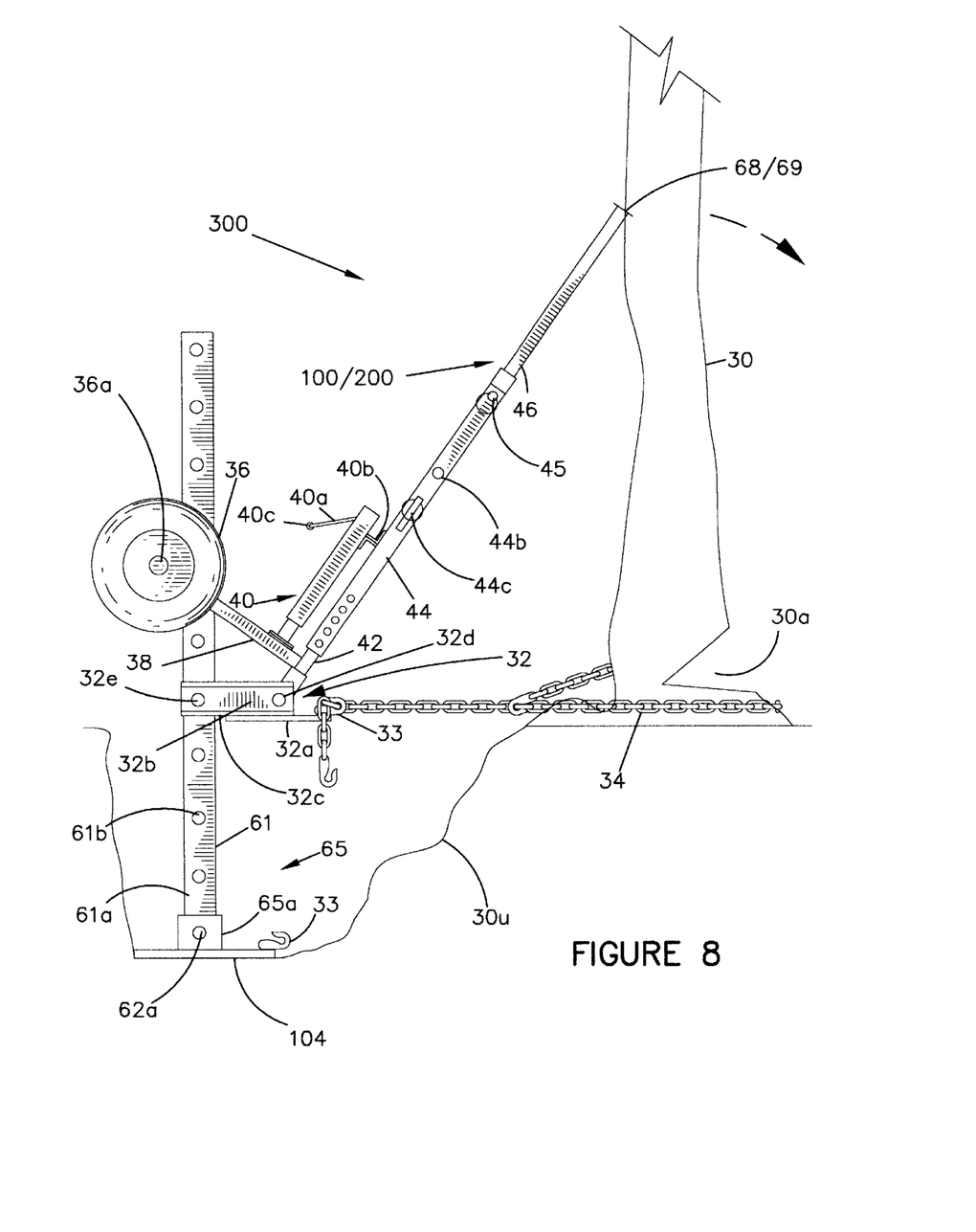
FIG. 8 is an isometric side elevation of a third embodiment of a tree pusher made in accordance with the principles of the present invention, the tree pusher engaging a tree that is to be felled.

Reference is now made to FIG. 8, in which is shown a third embodiment of a tree pusher, made in accordance with the principles of the present invention, and generally designated by the numeral 300. This embodiment of the tree pusher is used on unlevel ground that is substantially below the level of a tree to be cut down.

A base extension 65 (shown in FIG. 8A) comprises a first plate 104 to which are fastened in a perpendicular orientation a pair of parallel second plates 65a spaced apart and having openings 65b. A rectangular tube 61 has an end 61a disposed between the plates 65a. The tube 61 includes a plurality of openings 61b along its length. One of the openings 61b is at the end 61a of the tube 61, and is used to lock the tube 61 to the plates 65a and thereby to the base 65, by inserting a locking pin 62a in and through the openings 63b and 61b.

The base 32 shown in FIGS. 1 and 2 is mounted on the tube 61 and the base extension 65 by inserting and locking the pin 32e in one of the other openings 61b, by appropriate choice of the specific opening 61b, the base 32 and the tree pusher 100/200, signifying either embodiment 100 or 200, can be raised to the appropriate height to engage and fell the tree 30. The head 68/69 may be either the pronged head 68 or the wrap-around head 69.

Figure 8A:
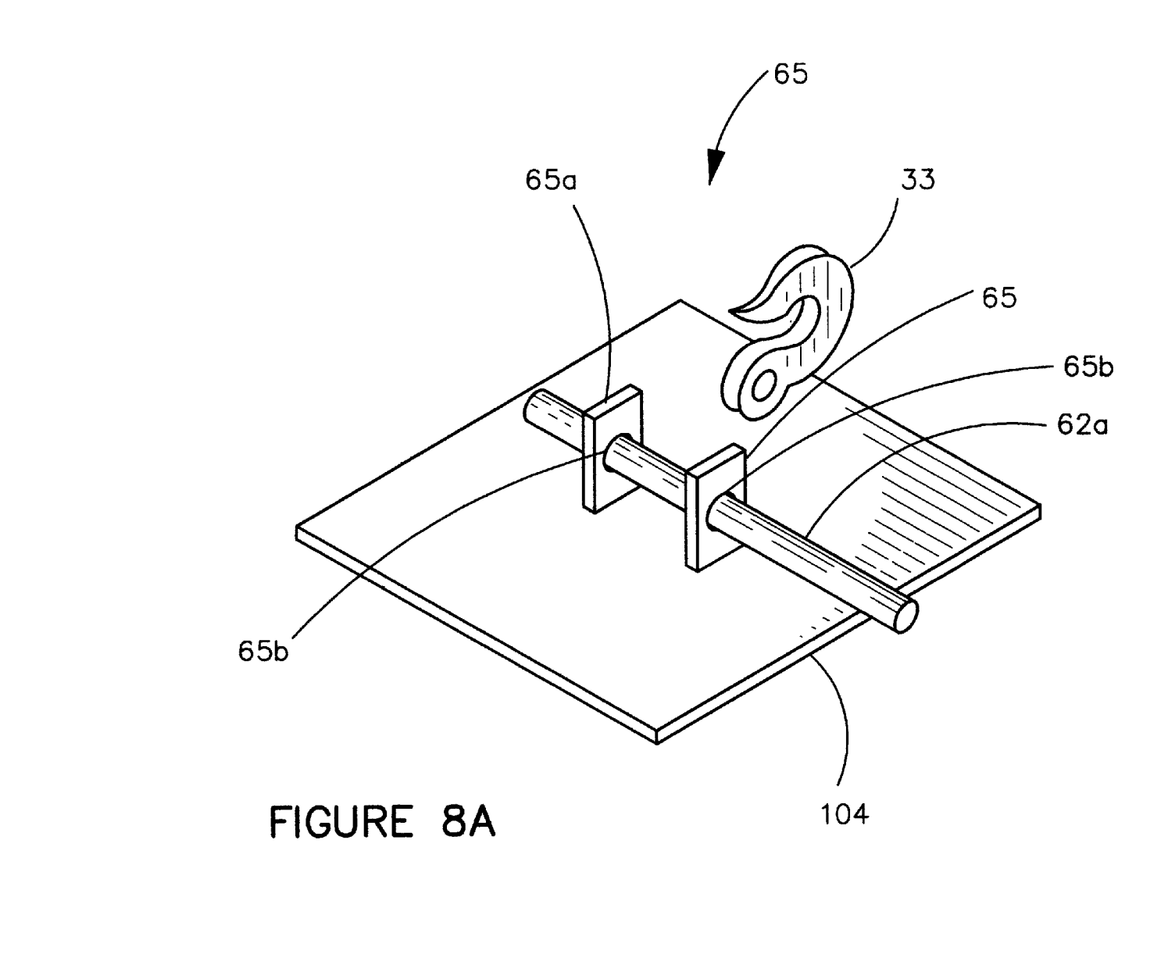
FIG. 8A is an enlarged isometric view of a portion of the tree pusher shown in FIG. 8.

Attachment of the hook 33 to the plate 104 provides a modified base that can be used to replace the base 32 of the first and second embodiments 100 and 200 when the tree pusher is to be used on substantially level ground.

It is critically important that both heads 68 and 69 be detachable from the frame 35, and that they remain attached to the tree trunk as the tree falls. For this reason it is critical that the tubes 48 and 12 be cylindrical, not rectangular. A cylindrical tube can freely rotate in the tube 46 as the tree falls; a rectangular tube would bind. Detachability of the heads 68 and 69 is a very important advantage of the present invention over the prior art.

The construction of the pronged head 68 of the tree pusher is critical because in order to attach itself to the tree, the head 68 must embed itself and remain embedded in the wood of the tree. Otherwise, the bark of pine and hardwood trees will break, and the head 68 will come loose and slide off the trunk of the tree. With the head 68 constructed as shown, having prongs 68a which define an angle 68b of from about five to about thirty degrees with the fifth tube 48, the pronged head 68 will remain in contact with the tree 30 as the tree is pushed over the center of gravity of the tree to the point where the tree will fall. The center of gravity of a tree that is leaning e.g. ten degrees with limbs on the side toward which the tree is leaning is not in line with the trunk, but somewhere out on the limbs. A tree with this type of lean has to be pushed far over center before the tree will fall. The angle 68b of the prongs 68a keeps the pronged head 68 in contact with the trunk until and as the tree falls.

For trees that are twisted or crooked, the pronged head 68 must embed and remain embedded in the wood, because the tree will twist or move while being felled. The head 68 must remain embedded in the wood, and must be able to turn in the frame of the tree pusher so as not to lose contact with the tree, or move the frame of the tree pusher during the felling operation. The head 68 cannot be fastened or remain attached to the frame of the tree pusher, because if the tree twisted or turned, the head 68 would twist or turn the frame of the tree pusher, causing loss of control of the tree-pushing operation. As constructed, the pronged head 68 will turn or twist with the movement of the tree, and not move or twist the frame of the tree pusher.

As constructed and arranged, the heads 68 and 69 will detach from the frame of the tree pusher and stay with the falling tree, leaving the rest of the tree pusher safe and unmoved, after which the head 68 or 69 can and would be removed and recovered from the trunk of the fallen tree, to be reused in future operations.

Prior-art tree pushers do not have this important feature. Consequently, either the head will pull out of the tree and remain with the frame as the tree falls, or the entire tree pusher will be pulled over along with the falling tree. In the former case, control of the operation will be lost; in the latter, a very dangerous situation will be created, which could possibly cause serious injury to personnel and/or major damage to the tree pusher.

A second improvement over the prior art is the use of a screw-type trailer jack which is extendable, which is capable of handling the weight of a large tree, and which can be repaired or changed out under load during the tree-felling operation.

A third improvement is the securing of the tree pusher to the base of the tree by a chain or equivalent means. This enables the tree pusher to be used in and on any type of terrain including hard surfaces, and to maintain the tree pusher steady in the desired location while the operation is in progress. Tying the base of the tree pusher to the base of the tree which becomes a stump enables easy removal of the chain therefrom after the tree has been cut down.

A fourth advantage is the capability of transporting the tree pusher to the job site, made possible by the wheel 36.

A fifth advantage is the capability of using the tree pusher on unlevel ground or terrain.

Other improvements and advantages over the prior art will be apparent to those skilled in the art from the above detailed description of the invention.

While certain embodiments and details have been described to illustrate the present invention, it will be apparent to those skilled in the art that many modifications thereof can be made without departing from the spirit, scope, and basic concept of the invention.

I claim:

1. A tree-pusher for felling a tree, the tree-pusher comprising:
   (a) a base;
   (b) a frame, mounted on the base, the frame comprising first, second, third, and fourth rectangular tubes having first and second ends, the first tube being pivotally connected to the base, the second tube being disposed in the first tube, the third tube being constructed and arranged to slide over the second tube, and the fourth tube being constructed and arranged to be inserted in and pinned to the third tube;
   (c) a detachable head constructed and arranged to be disposed in the fourth tube, to attach itself to a trunk of the tree, and to detach itself from the frame of the tree pusher and remain attached to the trunk of the tree when the tree falls; and
   (d) a screw-type trailer jack which is attached to the frame, which is extendable, and which is capable of bearing the weight of a large tree, for urging the frame and head of the tree pusher against the trunk of the tree.

2. The tree pusher of claim 1, further comprising:
   (e) a wheel connected to the frame, for moving the tree pusher.

3. The tree pusher of claim 1, further comprising:
   (e) means for connecting the base of the tree pusher to the trunk of the tree, for immobilizing the base while the tree is being felled.

4. The tree pusher of claim 1, wherein the head is a pronged head comprising a cylindrical fifth tube having first and second ends and a plurality of prongs at the first end of the fifth tube, the second end of the fifth tube being constructed and arranged to be disposed in the fourth tube, the prongs being constructed and arranged to extend from the fourth tube and attach to the tree trunk.

5. The tree pusher of claim 4, wherein the cylindrical tube and each prong define therebetween an angle of from about five to about thirty degrees.

6. The tree pusher of claim 1, wherein the head is a wrap-around heard comprising first and second faces, the first face having a cylindrical tube pivotally attached thereto, a ratchet binder and a hook fastened to opposite sides of the first face, and a strap having a first end connected to the ratchet binder and a second end connected to the hook, the second face having a plurality of teeth fastened thereto, to penetrate and embed themselves in dead wood of a tree trunk and, in combination with the strap which is wrapped around the tree trunk, hold the tree pusher firmly and securely to the trunk of the tree.

7. The tree pusher of claim 1, wherein the base comprises a split plate having first and second portions, first and second parallel channel irons spaced apart from one another and fastened to the first portion of the split plate in a perpendicular orientation, a hook fastened to the first portion of the split plate, for attachment of a chain to the hook and thereby to the base, and a pair of parallel plates spaced apart and fastened to the second portion of the split plate, first ends of the channel irons being constructed and arranged to be fastened to one another and pivotally connected to the first rectangular tube, second ends of the channel irons being constructed and arranged to be fastened to one another and to the pair of parallel plates, thereby fastening the first and second portions of the split plates to one another.

8. The tree pusher of claim 1, wherein the base comprises a first plate; a pair of parallel second plates, spaced apart and fastened to the first plate in a perpendicular orientation, and constructed and arranged to be fastened to one another and pivotally connected to the firt rectangular tube; and a hook fastened to the first plate, for attachment of a chain to the hook and thereby to the base.

9. The tree pusher of claim 7, further comprising:
   (e) a base extension for mounting and elevating the base of the tree pusher when felling a tree on ground that is substantially above level of ground supporting the tree pusher.

10. The tree pusher of claim 9, wherein the base extension comprises a first plate, and a pair of parallel second plates spaced apart and fastened to the first plate in a perpendicular orientation; and the base is mounted on the base extension by a fifth rectangular tube having first and second ends and a plurality of openings along its length, the first end of the fifth tube being disposed between and locked to the pair of parallel second plates, the base being mounted on the fifth tube at a required elevation by locking the base to the fifth tube by a locking pin through the second ends of the channel irons and through an opening between the first and second ends of the fifth tube.

11. A tree pusher for felling a tree, the tree pusher comprising:
   (a) a base for elevating the tree pusher when the tree to be felled is on ground slightly above level of ground supporting the tree pusher, the base comprising a first plate 60, a second plate 32*i*, and third and fourth parallel plates 60*a* and 60*b* spaced apart and fastened perpendicularly to the first plate 60;
   (b) a frame, mounted on the base, the frame comprising first, second, and third rectangular tubes having first and second ends; the first tube 42 being pivotally connected to the base, fastened to the second plate 32*i* and disposed in the second tube 44; and the third tube 46 being constructed and arranged to be inserted in and pinned to the second tube;
   (c) a detachable head constructed and arranged to be disposed in the third tube 46, to attach itself to a trunk of the tree, and to detach itself from the frame of the tree pusher and remain attached to the trunk of the tree as the tree falls;

(d) a screw-type trailer jack which is attached to the frame, which is extendable, and which is capable of bearing the weight of a large tree, for urging the frame and head of the tree pusher against the trunk of the tree; and (e) a fourth rectangular tube 62, disposed between and pivotally attached to third and fourth parallel plates 60a, 60b and to the first plate 60, and extending through the first and second tubes 42 and 44.

12. A method for felling a tree, the method comprising the steps of:

(a) providing a tree-pusher having a base, a frame, a detachable head which engages the tree trunk, and a screw-type propeller trailer jack for urging the frame and the head against the trunk of the tree;

(b) securely connecting the base of the tree-pusher to a trunk of the tree;

(c) attaching the head and frame of the tree-pusher to the trunk of the tree;

(d) cutting a notch in the trunk of the tree above the point of attachment of the tree pusher and on the side opposite the attachment of the head and frame thereto; and (e) using the jack to urge the head and frame of the tree-pusher against the tree trunk to fell the tree, detach the head from the frame of the tree pusher, and leave the head of the tree pusher attached to the trunk of the tree.

13. The method of claim 12, wherein the head is a pronged head comprising a cylindrical tube having first and second ends and a plurality of prongs at the first end of the cylindrical tube, the cylindrical tube and each prong defining therebetween an angle of from about five to about thirty degrees.

14. The method of claim 12, wherein the head is a wrap-around head constructed and arranged to be wrapped around the trunk of the tree, the wrap-around head comprising a first plate having second and third plates spaced apart and fastened to the first plate in a perpendicular orientation, the second and third plates each including a substantially central opening therein, the central openings defining therebetween a straight line substantially parallel to the first plate; a cylindrical tube having a first end pivotally attached to the second and third plates by a bolt disposed in the central openings; a ratchet binder fastened to the first plate in an orientation substantially perpendicular to the first plate and substantially parallel to the bolt disposed in the central openings; and a strap having a first end connected to the ratchet binder and a second end connected to a ring which is connected to a hook on the ratchet binder.

* * * * *